Patented Apr. 26, 1927.

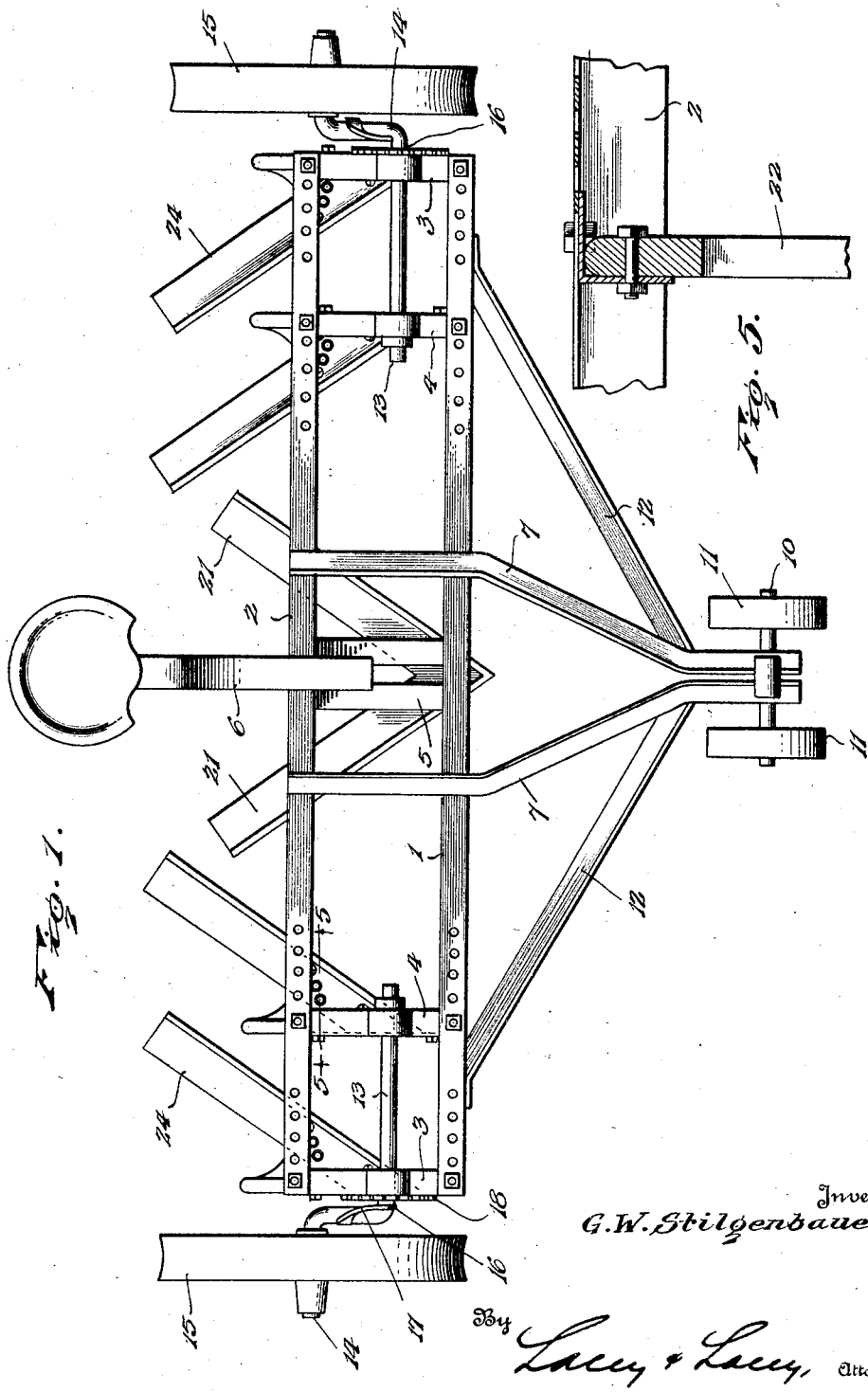

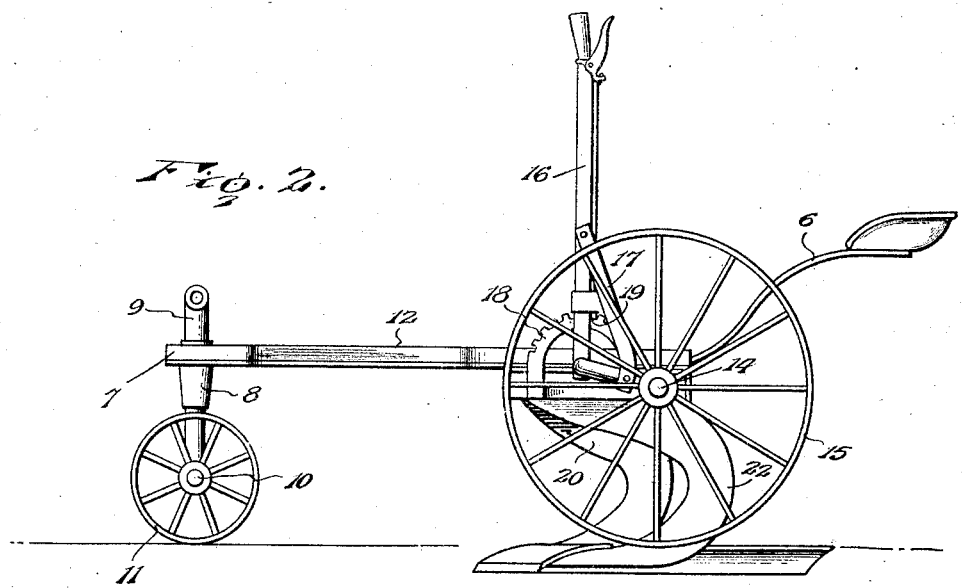
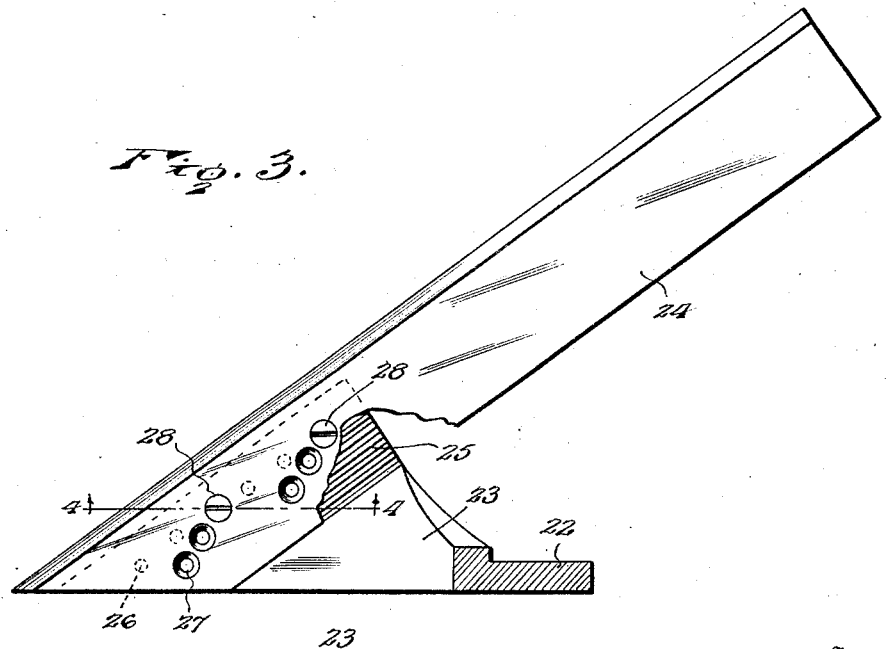
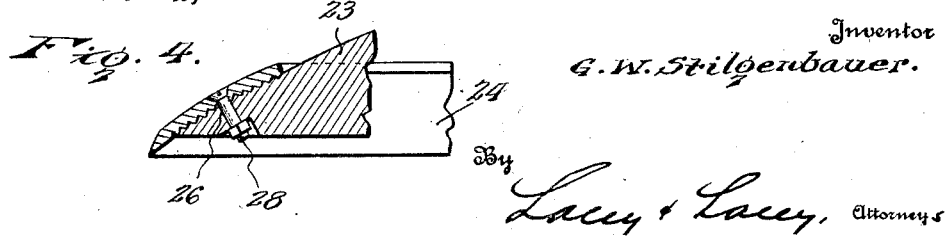

1,625,834

UNITED STATES PATENT OFFICE.

GLENN W. STILGENBAUER, OF SHEPHERD, MICHIGAN.

CULTIVATOR.

Application filed September 30, 1926. Serial No. 138,733.

The invention relates to agricultural implements and more particularly to a cultivator for preparing the soil for planting after the ground has been plowed.

The invention provides an implement for breaking up clods and leveling the soil which is essential preliminary to planting, said implement being adjustable to meet various conditions arising from location, nature of soil and character of surface.

While the drawings illustrate a preferred embodiment of the invention, it is to be understood that in adapting the means to meet specific needs and requirements the design may be varied and such other changes in the minor details of construction may be resorted to within the scope of the invention as claimed, without departing from the spirit thereof.

For a full understanding of the invention and the merits thereof, reference is to be had to the following description and the drawings hereto attached, in which,—

Figure 1 is a top plan view of an agricultural implement embodying the invention, Figure 2 is a side view of the implement, Figure 3 is an enlarged sectional view of one of the standards with a blade or sweep in position and having a portion broken away to show more clearly the corrugated sweep therefor.

Figure 4 is a detail sectional view on the line 4—4 of Figure 3, and

Figure 5 is an enlarged detail sectional view on the line 5—5 of Figure 1, looking in the direction of the arrows.

Corresponding and like parts are referred to in the following description and designated in the several views of the drawings by like reference characters.

The implement comprises a main frame and a draft frame, the main frame being relatively long and narrow, and disposed transversely with reference to the line of travel of the implement. It is preferred to utilize angle bars in the formation of the frame. The main frame comprises spaced front and rear bars 1 and 2, and intermediate connecting bars 3 and 4 which are preferably adjustable along the length of the bars 1 and 2, to admit of varying the width or track of the implement as required. Other bars 5 connect the bars 1 and 2 and are located intermediate the ends thereof and support a seat bar 6.

The draft frame comprises similar bars 7 which are connected at their rear ends to the bars 1 and 2 and project forwardly from the main frame and have the projecting portions converge and brought together and secured to opposite sides of a vertical bearing 8 in which is journaled a stem 9 which is provided at its lower end with an axle 10 upon which are mounted wheels 11. Braces 12 connect the forward ends of the bars 7 with the main frame.

An axle 13 is located at each end of the main frame and is mounted in the bars 3 and 4 and is provided at its outer end with a crank 14 which receives a ground wheel 15. Rotation of the axle 13 results in vertical adjustment of the main frame, and a corresponding adjustment of the depth of action of the blades or like devices whereby the earth is pulverized or otherwise treated. A lever 16, mounted upon each of the axles 13 and connected to the crank 14 by means of a brace 17, provides means for adjusting the axles and the main frame, as required. A toothed bar 18 attached to the bar 3 cooperates with a hand operated latch bolt 19 mounted upon the lever, whereby to hold the latter in the required adjusted position.

A standard 20 centrally disposed, is connected to the bars 5 and is provided at its lower end with oppositely inclined blades or sweeps 21. Other standards 22 are bolted, or otherwise attached, at their upper ends to the respective bars 3 and 4 and their lower ends are enlarged. as indicated at 23, to provide seats for blades or sweeps 24. The standards 22 at one side of the center of the main frame have the seats 23 facing inwardly and the standards upon the opposite side of the center of the frame have the seats 23 similarly disposed, and as a result, the blades or sweeps 24 at opposite ends of the main frame, are reversely inclined, as shown most clearly in Figure 1. In this connection it is observed that there may be any number of standards as required, and the blades or sweeps 24 are adjustable to vary their pitch.

Each of the seats 23 is convex upon its top side, whereby to provide for circular adjustment of the blades or sweeps so that the pitch may be regulated within certain limits to suit the nature of the soil being treated. The top convex side of the seats 23 is corrugated as indicated at 25, and the corresponding bottom side of the blade or sweep is correspondingly corrugated to insure positive seating of the blade and prevent casual displacement thereof. The seat 23 is provided with groups of openings 26 and each of the blades or sweeps has corresponding groups of openings 27. Adjustment of the blades or sweeps upon the seats 23 to regulate its pitch brings certain openings 26 and 27 in registering position to receive bolts or analogous fastenings 28 whereby to secure the blades or sweep in the required adjusted position.

Having thus described the invention, I claim:

1. In an implement of the character specified, a standard enlarged at its lower end to provide a seat which is convex upon its top side, a blade mounted upon the seat and adjustable to admit of its pitch being varied and means for securing the blade to its seat.

2. In an implement of the character specified a standard, enlarged at its lower end to provide a seat which is convex upon its top side and provided with groups of openings, a blade adjustable on the seat to vary its pitch and provided with corresponding groups of openings, and fastenings insertable through registering openings of the groups to secure the blade in the required adjusted position.

In testimony whereof I affix my signature.

GLENN W. STILGENBAUER. [L. S.]